United States Patent [19]

Lichtinger et al.

[11] Patent Number: 5,092,759

[45] Date of Patent: Mar. 3, 1992

[54] INJECTION MOLDING ASSEMBLY FOR PRODUCING DISK-SHAPED INFORMATION CARRIERS AND SLEEVE FOR THE AXIAL RETENTION AND RADIAL CENTERING OF A MATRIX

[75] Inventors: Peter Lichtinger, Fürstenfeldbruck; Gabrial Ringelstetter, Munich, both of Fed. Rep. of Germany

[73] Assignee: Krauss-Maffei Aktiengesellschaft, Munich, Fed. Rep. of Germany

[21] Appl. No.: 614,864

[22] Filed: Nov. 16, 1990

[30] Foreign Application Priority Data

Nov. 27, 1989 [DE] Fed. Rep. of Germany ....... 3939195

[51] Int. Cl.⁵ ............................................ B29C 45/34
[52] U.S. Cl. .................................... 425/546; 264/107; 425/810; 425/812
[58] Field of Search ................ 425/810, 812, 546; 264/106, 107

[56] References Cited

U.S. PATENT DOCUMENTS 4,374,636  2/1983  Holmes ............................. 425/810
4,795,127  1/1989  Asai .................................. 425/810

FOREIGN PATENT DOCUMENTS 48395   5/1971  Australia .
262863  4/1988  European Pat. Off. .

Primary Examiner—Tim Heitbrink
Attorney, Agent, or Firm—Herbert Dubno

[57] ABSTRACT

A bushing for the axial retention and radial centering of a matrix in an injection mold for producing information carriers such as CD's is formed on the underside of its retention shoulder with channels for carrying away the air which tends to be compressed along the outer edge of the shoulder, thereby eliminating streaks or so called schlieren in the information-carrier disk which is produced.

1 Claim, 3 Drawing Sheets

INJECTION MOLDING ASSEMBLY FOR PRODUCING DISK-SHAPED INFORMATION CARRIERS AND SLEEVE FOR THE AXIAL RETENTION AND RADIAL CENTERING OF A MATRIX

FIELD OF THE INVENTION

Our present invention relates to an injection molding assembly for producing disk-shaped information carriers and, specifically, to an injection-molding die for that purpose. More particularly, the invention relates to a sleeve for the axial retention and radial centering of a matrix or die disk utilized in an injection molding die or mold, especially for the production of information carriers like compact disks (CD's) wherein the sleeve has a circumferential shoulder at its upper edge.

BACKGROUND OF THE INVENTION

In the production of disk-shaped information carriers, for example, compact disks (CD's) and especially information carriers for reproduction of audio and video signals, for the storage of data and the like, it is known to provide the disk at an upper surface thereof with a so called stacking bead.

This bead at the upper surface is coaxial with an annular recess at the lower surface which is defined in part within the injection mold by a shoulder provided on a sleeve which serves in the mold to overhang a matrix or forming a disk constituting part of the die or mold against which the material of the information carrier is injection molded.

It has been found, in the use of such dies that the injection molding of the information carrier disk produces so called schlieren or streaks which may render the disk unusable as in information carrier.

Efforts have been made to reduce the formation of such streaks or eliminate streaking by a slow injection of the synthetic resin material into the injection-molding or die cavity. This, however, results in a long cycling time of the mold and the apparatus, a low production rate and a poor productivity of the equipment. This method, therefore, has been found to be uneconomical.

OBJECTS OF THE INVENTION

It is, therefore, the principal object of the present invention to provide an injection molding assembly which is improved to the point that the formation of schlieren or streaks on the information-carrying disk is eliminated without increasing the cycle time for production of the information carrier disks by injection molding.

Another object of the invention is to provide an apparatus which will allow the reproducible and relatively high rate production of information carrying disks of high quality and without streaking defects.

Still another object of this invention is to provide an improved bushing or sleeve for use in an assembly for the injection molding of information-carrier disks such as CD's having stacking beads of the type described.

SUMMARY OF THE INVENTION

We have discovered that these objects can be achieved when, for the axial retention and radial centering of the matrix disk in the injection molding die cavity a bushing is used which is formed with a circumferential shoulder at an upper edge of the bushing and is characterized by the provision of means for leading away air which, during the injection process, tends to be compressed ahead of an outer edge of the shoulder and/or in a possible fine gap between the underside of the shoulder and the upper surface of the matrix.

More particularly, an injection molding assembly according to the invention for producing disk-shaped information carriers such as CD's with stacking beads formed on the upper surface thereof can comprise:

- a die plate having a bore and a support surface at which the bore opens;
- a matrix for an information-carrier disk lying against the surface and having a face turned away from the surface;
- a bushing received in the bore for axial retention and radial centering of the matrix on the die plate, the bushing having an end protruding beyond the face and formed with a circumferentially extending annular shoulder overhanging the face and having an outer edge at which air is compressed upon injection of a material forming the information-carrier disk against the matrix, the bushing having a centering region engaging the matrix and adjacent the shoulder; and means for removing the air compressed at the outer edge.

The invention is based upon our investigations which have shown that the streak formation or schlieren previously mentioned are due to air which, upon the injection molding of synthetic resin material into the cavity, tends to be compressed against the outer edge of the shoulder of the bushing or to be forced into any narrow gap which almost invariably is present between this shoulder and the surface of the matrix overlain by the shoulder.

The compressed air appears to produce the streaks which can extend into the information carrying regions of the injection molded disk and can render the latter unusable. Our research has shown further that the streak formation is greatest when the information carrier is formed with the aforementioned stacking bead since the presence of the formations in the mold or die required to produce this bead in the information carrier disk increases the volume of air trapped and thus the effect of compression of air ahead of the outer edge of the retaining shoulder.

According to a feature of the invention, the removal of air is effected through passages formed on the underside of the shoulder of the bushing and thus running along this underside from the outer edge inwardly. A multiplicity of these passages, i.e. downwardly open channels, can be angularly equispaced around the bushing and can extend radially therein.

These channels, open toward the upper surface of the matrix adapted to be contacted by the injected synthetic resin, communicate with channels running generally along the axis of the bushing through the centering region thereof, i.e. the region of the bushing adjacent the shoulder by means of which the matrix is centered on its die plate.

According to a further feature of the invention, the shoulder defines with the face a narrow gap and the means for removing the air compressed at the outer edge includes means for withdrawing the air from the gap.

A collecting duct receiving air from at least some of the passages can be provided and this duct can communicate with a manifold channel extending circumferentially around the bushing and communicating with all of the passages or channels.

The duct can communicate with ambient atmosphere to form a simple vent or means can be provided for evacuating the air and such means can be connected to the duct.

BRIEF DESCRIPTION OF THE DRAWING

The above and other objects, features and advantages of the present invention will become more readily apparent from the following description, reference being made to the accompanying highly diagrammatic drawing in which.

SPECIFIC DESCRIPTION

Figure 1:
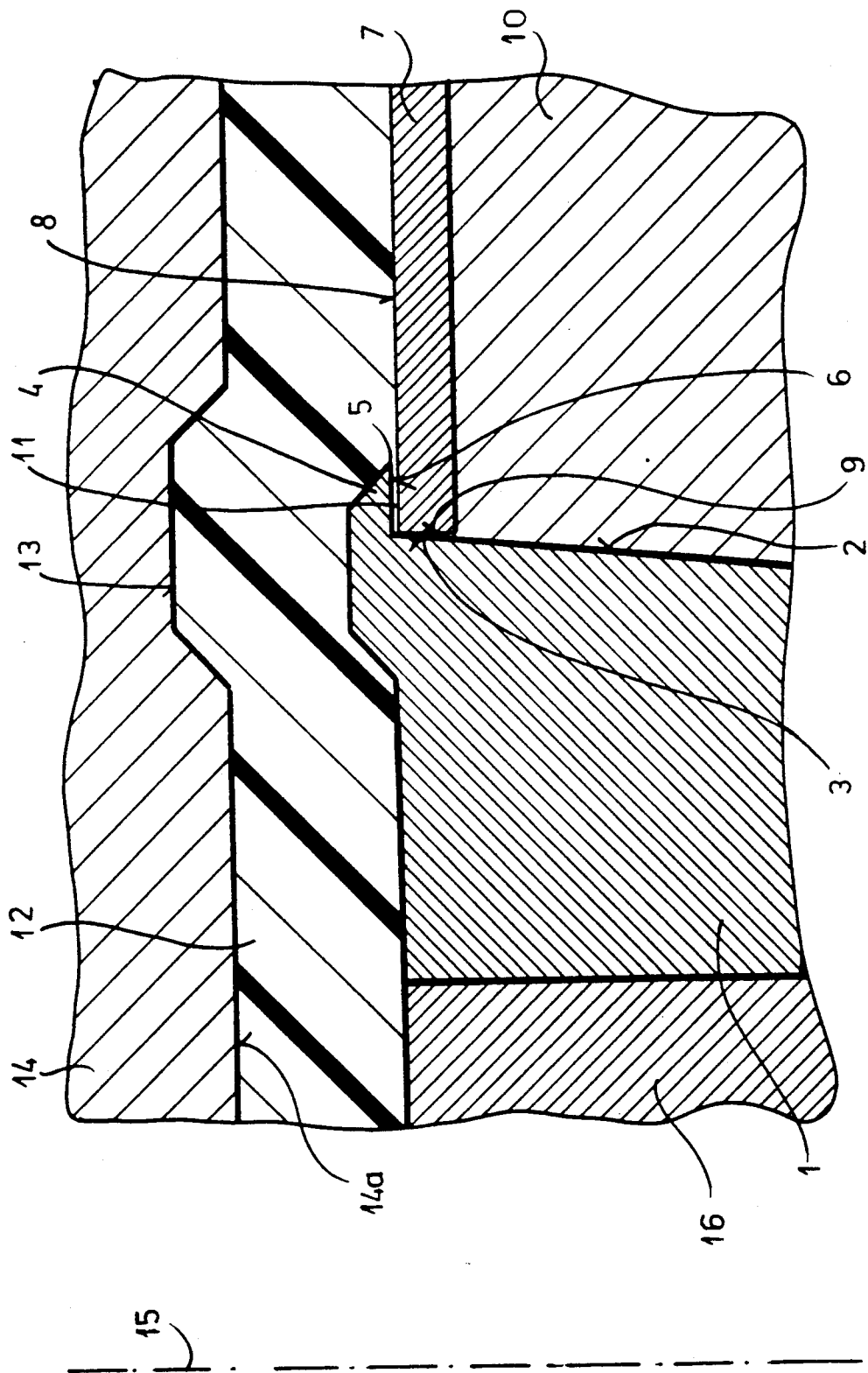
FIG. 1 is a partial cross section of an injection molding assembly or die for producing disk-shaped information carriers, e.g. CD's, in the region of a bushing for axially retaining and radially centering a matrix according to the prior art.
Figure 2:
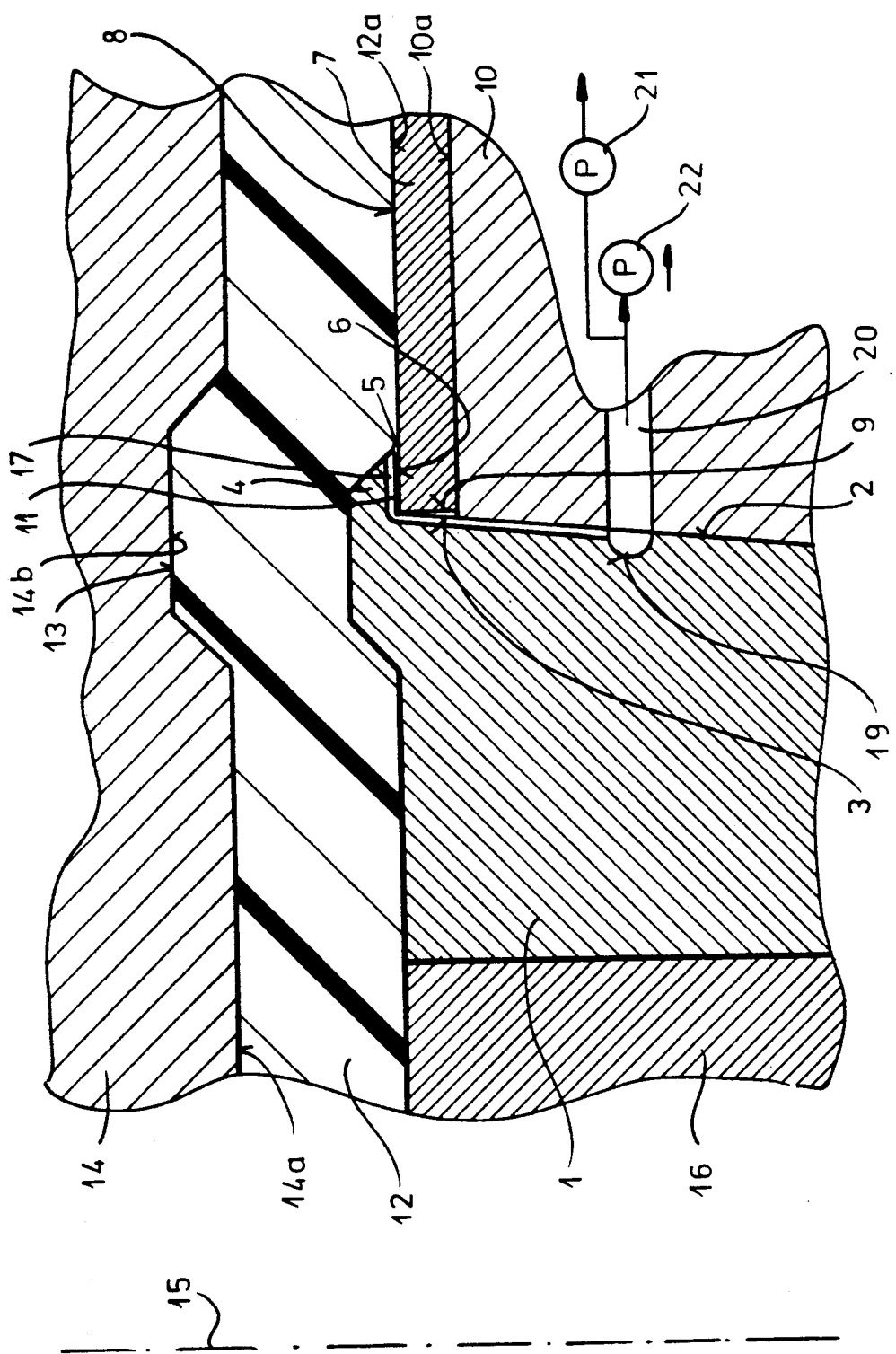
FIG. 2 is a view similar to FIG. 1 illustrating the principles of the invention.

As can be seen from FIGS. 1 and 2, a bushing 1 with a conical fitting surface 2 can be received in a conical bore of a die plate 10 having a mirror surface 10a supporting a matrix 7 which defines the face 12a of an injection-molded information-carrying disk 12 to be produced in the die.

The bushing 1 also has a generally frustoconical centering region 13 which radially positions the matrix 7 adjacent a shoulder 4 overhanging the matrix to provide the axial retention. The shoulder 4 has an outer edge 5 and an underside 6 confronting the surface 8 of the matrix.

Between the underside 6 of the shoulder 4 and the open surface 8 of the matrix 7, a fine gap 11 may form.

Above the bushing 1 and the matrix 7, the injection-molded plastic forms the compact disk 12 which is defined in part by an upper die plate 14 having a mirror finish surface 14a and provided with a recess 14b in which a stacking bead 13 can be formed on the CD.

The dot-dash line 15 shows the axis of the CD and the axis of the die and makes clear that all of the parts illustrated in FIG. 1 are symmetrical about this axis. A guide pin 16 extends through the bushing 1. As can be seen from FIGS. 2 through 4, the bushing 1 is provided with downwardly open channels 17 in its underside 6, these channels opening at the edge 5 at which compressed air accumulates and serve also to guide inwardly any air compressed by the injection molding process, thereby removing the barrier to escape of air and insuring a streak-free-injection molding process.

Figure 3:
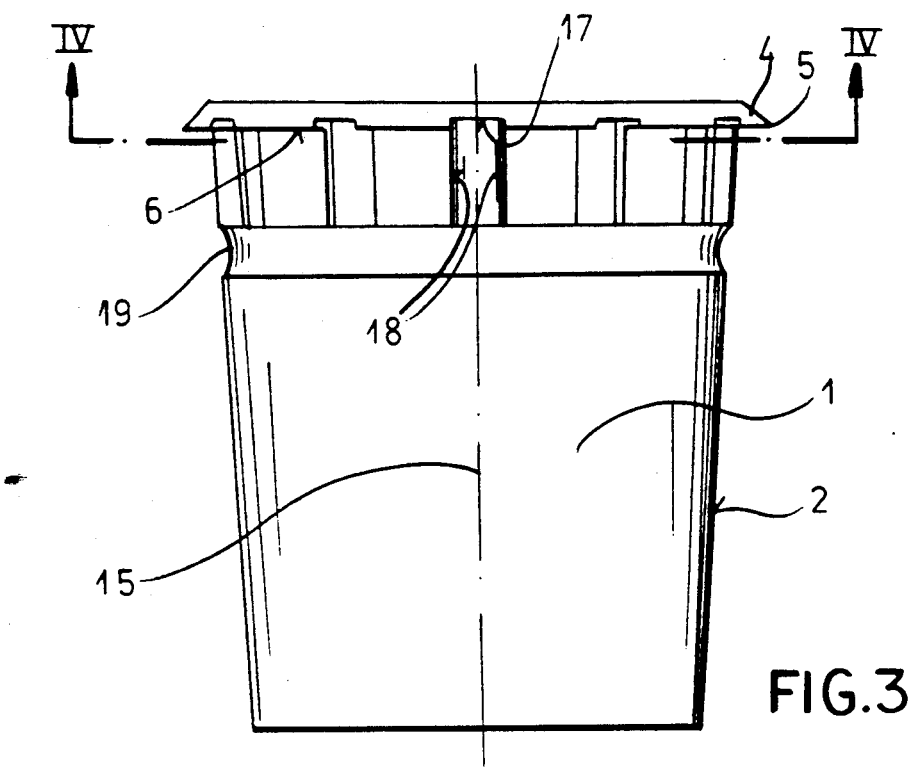
FIG. 3 is a side elevational view of a bushing according to the invention.
Figure 4:
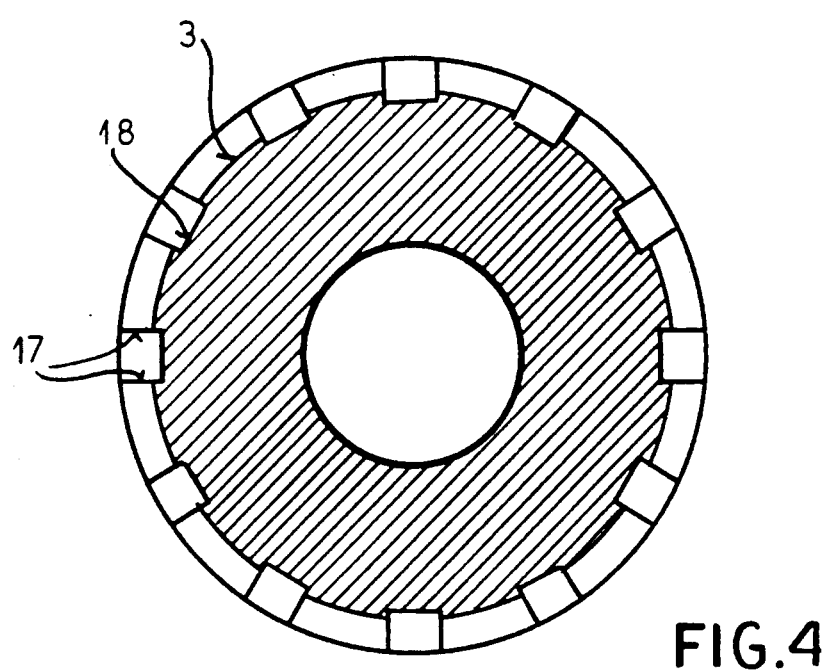
FIG. 4 is a cross sectional view taken along the line IV—IV of FIG. 3.

The channel 17 communicates with channels 18 running through the centering region 3 and terminating in a manifold channel 19 formed on the bushing (see FIGS. 3 and 4). The channel 19, in turn, communicates with a passage 20 formed in the plate 10 and connected via a valve 21 to the atmosphere if simple venting is desired or to a suction pump 22 if it is desired to evacuate the air accumulated in the mold ahead of the edge 5.

The channels 17 are dimensioned to be sufficiently small that the air can escape, but the surface tension and other rheological conditions of the injection plastic will prevent penetration thereof into the channels 17.

We claim:

1. An injection-molding assembly for producing disk shaped information carriers, said assembly comprising:
   a die plate having a bore and a support surface at which said bore opens;
   a matrix for an information-carrier disk lying against said surface and having a face turned away from said surface;
   a bushing received in said bore for axial retention and radial centering of said matrix on said die plate, said bushing having an end protruding beyond said face and formed with a circumferentially extending annular shoulder overhanging said face and having an outer edge at which air is compressed upon injection of a material forming said information-carrier disk against said matrix, said bushing having a centering region engaging said matrix and adjacent said shoulder; and
   air removing means for removing the air compressed at said outer edge, said air removing means including a multiplicity of passages formed on an underside of said shoulder juxtaposed with said face and extending at least into said region and through a hole in said matrix through which said bushing passes, said passages being in angularly equispaced relationship along said shoulder and said region, said air removing means further including a collecting duct receiving air from at least some of said passages and a manifold channel extending circumferentially around said bushing for communicating with all of said passages and with said duct, during said injection said air removing means communicating with an atmosphere outside said assembly, and an evacuating means for evacuating said air connected to said duct.

* * * * *